(12) United States Patent
Ramaswamy

(10) Patent No.: US 12,047,282 B2
(45) Date of Patent: Jul. 23, 2024

(54) METHODS FOR SMART BANDWIDTH AGGREGATION BASED DYNAMIC OVERLAY SELECTION AMONG PREFERRED EXITS IN SD-WAN

(71) Applicant: VMware LLC, Palo Alto, CA (US)

(72) Inventor: Navaneeth Krishnan Ramaswamy, Chennai (IN)

(73) Assignee: VMware LLC, Palo Alto, CA (US)

( * ) Notice: Subject to any disclaimer, the term of this patent is extended or adjusted under 35 U.S.C. 154(b) by 69 days.

(21) Appl. No.: 17/870,817

(22) Filed: Jul. 21, 2022

(65) Prior Publication Data

US 2023/0028872 A1 Jan. 26, 2023

(30) Foreign Application Priority Data

Jul. 22, 2021 (IN) .............................. 202141032990

(51) Int. Cl.
*H04L 45/00* (2022.01)
*H04L 45/12* (2022.01)
(52) U.S. Cl.
CPC ............ *H04L 45/38* (2013.01); *H04L 45/123* (2013.01); *H04L 45/566* (2013.01)
(58) Field of Classification Search
CPC ...... H04L 45/38; H04L 45/123; H04L 45/566
USPC ....................................................... 709/238
See application file for complete search history.

(56) References Cited

U.S. PATENT DOCUMENTS

| 5,652,751 | A  | 7/1997  | Sharony       |
| 5,909,553 | A  | 6/1999  | Campbell et al. |
| 6,154,465 | A  | 11/2000 | Pickett       |
| 6,157,648 | A  | 12/2000 | Voit et al.   |
| 6,201,810 | B1 | 3/2001  | Masuda et al. |
| 6,363,378 | B1 | 3/2002  | Conklin et al. |
| 6,445,682 | B1 | 9/2002  | Weitz         |
| 6,744,775 | B1 | 6/2004  | Beshai et al. |

(Continued)

FOREIGN PATENT DOCUMENTS

| CN | 1926809 A   | 3/2007 |
| CN | 102577270 A | 7/2012 |

(Continued)

OTHER PUBLICATIONS

A Frame Aggregation Extension of Routing Algorithm for Wireless Mesh Networks Nobuo Funabiki; Yuuma Tani; Shigeto Tajima 2014 Second International Symposium on Computing and Networking Year: 2014 | Conference Paper | Publisher: IEEE (Year: 2014).*

(Continued)

*Primary Examiner* — Mohamed Ibrahim
(74) *Attorney, Agent, or Firm* — Quarles & Brady LLP

(57) ABSTRACT

The method of some embodiments selects a set of links to forward packets of a data flow from an application running on a machine connected to an SD-WAN that has multiple exits. The method, based on computed sets of attributes for a first set of links and a second set of links, selects between the first set of links and the second set of links. At least the first set of links has multiple links and at least one attribute of the first set of links is an attribute that is computed by aggregating an attribute of each of the links in the first set of links. The method uses the selected set of links to forward the packets of the data flow of the application to an egress managed forwarding element of the SD-WAN.

20 Claims, 6 Drawing Sheets

(56) References Cited

U.S. PATENT DOCUMENTS

| | | | |
|---|---|---|---|
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1* | 4/2015 | Shah ................. H04L 69/14 370/232 |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |

(56) References Cited

U.S. PATENT DOCUMENTS

| | | |
|---|---|---|
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Pas et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |

(56) References Cited

U.S. PATENT DOCUMENTS

| | | |
|---|---|---|
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1* | 2/2013 | Casado ............... H04L 12/66 370/401 |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Mn et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0355441 A1 | 12/2014 | Jain |

(56) References Cited

U.S. PATENT DOCUMENTS

| | | |
|---|---|---|
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Domemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1* | 8/2016 | Jiao ............. H04L 47/2441 |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |

(56) References Cited

U.S. PATENT DOCUMENTS

| | | |
|---|---|---|
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1* | 3/2019 | Yousaf .................. H04L 45/745 |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |

(56) References Cited

U.S. PATENT DOCUMENTS

| | | |
|---|---|---|
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1* | 7/2019 | Chen ................. G06F 18/24147 |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1* | 8/2019 | Markuze ................. H04L 67/10 |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Dwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |

(56) References Cited

U.S. PATENT DOCUMENTS

| | | |
|---|---|---|
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerström et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0121871 A1 | 4/2023 | Mayya et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |

FOREIGN PATENT DOCUMENTS

| | | | |
|---|---|---|---|
| CN | 102811165 A | 12/2012 | |
| CN | 104956329 A | 9/2015 | |
| CN | 106230650 A | 12/2016 | |
| CN | 106656847 A | 5/2017 | |
| CN | 106998284 A | 8/2017 | |
| CN | 110447209 A | 11/2019 | |
| CN | 111198764 A | 5/2020 | |
| EP | 1912381 A1 | 4/2008 | |
| EP | 2538637 A2 | 12/2012 | |
| EP | 2763362 A1 | 8/2014 | |
| EP | 3041178 A1 | 7/2016 | |
| EP | 3297211 A1 | 3/2018 | |
| EP | 3509256 A1 | 7/2019 | |
| EP | 3346650 B1 | 11/2019 | |
| JP | 2002368792 A | 12/2002 | |
| JP | 2010233126 A | 10/2010 | |
| JP | 2014200010 A | 10/2014 | |
| JP | 2017059991 A | 3/2017 | |
| JP | 2017524290 A | 8/2017 | |
| KR | 20170058201 A | 5/2017 | |
| RU | 2574350 C2 | 2/2016 | |
| WO | 03073701 A1 | 9/2003 | |
| WO | WO-2005071861 A1 * | 8/2005 | ............ H04W 28/24 |
| WO | 2007016834 A1 | 2/2007 | |
| WO | 2012161184 A2 | 12/2012 | |
| WO | 2015092565 A1 | 6/2015 | |
| WO | 2016061546 A1 | 4/2016 | |
| WO | 2016123314 A1 | 8/2016 | |
| WO | 2017083975 A1 | 5/2017 | |
| WO | 2019070611 A1 | 4/2019 | |
| WO | 2019094522 A1 | 5/2019 | |
| WO | 2020012491 A1 | 1/2020 | |
| WO | 2020018704 A1 | 1/2020 | |
| WO | 2020091777 A1 | 5/2020 | |
| WO | 2020101922 A1 | 5/2020 | |
| WO | 2020112345 A1 | 6/2020 | |
| WO | 2021040934 A1 | 3/2021 | |
| WO | 2021118717 A1 | 6/2021 | |
| WO | 2021110465 A1 | 7/2021 | |
| WO | 2021211906 A1 | 10/2021 | |
| WO | 2022005607 A1 | 1/2022 | |
| WO | 2022082680 A1 | 4/2022 | |
| WO | 2022154850 A1 | 7/2022 | |
| WO | 2022159156 A1 | 7/2022 | |
| WO | 2022231668 A1 | 11/2022 | |
| WO | 2022235303 A1 | 11/2022 | |
| WO | 2022265681 A1 | 12/2022 | |
| WO | 2023009159 A1 | 2/2023 | |

OTHER PUBLICATIONS

Author Unknown, "VeloCloud Administration Guide: VMware SD-WAN by VeloCloud 3.3," Month Unknown 2019, 366 pages, VMware, Inc., Palo Alto, CA, USA.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop

(56) References Cited

OTHER PUBLICATIONS and Conference, Jan. 26-29, 2022, 6 pages, IEEE, Las Vegas, NV, USA.
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.
Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.
Bertaux, Lionel, et al., "Software Defined Networking and Virtualization for Broadband Satellite Networks, " IEEE Communications Magazine, Mar. 18, 2015, 7 pages, vol. 53, IEEE, retrieved from https://ieeexplore.ieee.org/document/7060482.
Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.
Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.
Guo, Xiangyi, et al., (U.S. Appl. No. 62/925,193), filed Oct. 23, 2019, 26 pages.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.
Lasserre, Marc, et al., "Framework for Data Center (DC) Network Virtualization," RFC 7365, Oct. 2014, 26 pages, IETF.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Lin, Weidong, et al., "Using Path Label Routing in Wide Area Software-Defined Networks with Open Flow," 2016 International Conference on Networking and Network Applications, Jul. 2016, 6 pages, IEEE.
Long, Feng, "Research and Application of Cloud Storage Technology in University Information Service," Chinese Excellent Masters' Theses Full-text Database, Mar. 2013, 72 pages, China Academic Journals Electronic Publishing House, China.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned U.S. Appl. No. 17/351,327, filed Jun. 18, 2021, 48 pages, VMware, Inc.
Non-Published Commonly Owned U.S. Appl. No. 17/351,342, filed Jun. 18, 2021, 47 pages, VMware, Inc.
Non-Published Commonly Owned U.S. Appl. No. 17/351,345, filed Jun. 18, 2021, 48 pages, VMware, Inc.
Non-Published Commonly Owned U.S. Appl. No. 17/384,735, filed Jul. 24, 2021, 62 pages, VMware, Inc.
Non-Published Commonly Owned U.S. Appl. No. 17/384,736, filed Jul. 24, 2021, 63 pages, VMware, Inc.
Non-Published Commonly Owned U.S. Appl. No. 17/384,738, filed Jul. 24, 2021, 62 pages, VMware, Inc.
Non-Published Commonly Owned U.S. Appl. No. 17/569,517, filed Jan. 6, 2022, 49 pages, VMware, Inc.
Non-Published Commonly Owned U.S. Appl. No. 17/569,519, filed Jan. 6, 2022, 48 pages, VMware, Inc.
Non-Published Commonly Owned U.S. Appl. No. 17/569,520, filed Jan. 6, 2022, 50 pages, VMware, Inc.
Non-Published Commonly Owned U.S. Appl. No. 17/569,522, filed Jan. 6, 2022, 48 pages, VMware, Inc.
Non-Published Commonly Owned U.S. Appl. No. 17/569,523, filed Jan. 6, 2022, 48 pages, VMware, Inc.
Non-Published Commonly Owned U.S. Appl. No. 17/569,524, filed Jan. 6, 2022, 48 pages, VMware, Inc.
Non-Published Commonly Owned U.S. Appl. No. 17/569,526, filed Jan. 6, 2022, 27 pages, VMware, Inc.
Non-Published Commonly Owned U.S. Appl. No. 17/574,225, filed Jan. 12, 2022, 56 pages, VMware, Inc.
Non-Published Commonly Owned U.S. Appl. No. 17/574,236, filed Jan. 12, 2022, 54 pages, VMware, Inc.
Non-Published Commonly Owned U.S. Appl. No. 17/695,264, filed Mar. 15, 2022, 28 pages, VMware, Inc.
Non-Published Commonly Owned U.S. Appl. No. 17/735,029, filed May 2, 2022, 36 pages, VMware, Inc.
Non-Published Commonly Owned U.S. Appl. No. 17/737,933, filed May 5, 2022, 30 pages, VMware, Inc.
Non-Published Commonly Owned U.S. Appl. No. 17/833,555, filed Jun. 6, 2022, 34 pages, VMware, Inc.
Non-Published Commonly Owned U.S. Appl. No. 17/833,566, filed Jun. 6, 2022, 35 pages, VMware, Inc.
Non-Published Commonly Owned U.S. Appl. No. 17/850,112, filed Jun. 27, 2022, 41 pages, Nicira, Inc.
Non-Published Commonly Owned U.S. Appl. No. 17/943,147, filed Sep. 12, 2022, 42 pages, Nicira, Inc.
Non-Published Commonly Owned U.S. Appl. No. 15/803,964, filed Nov. 6, 2017, 15 pages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

(56) References Cited

OTHER PUBLICATIONS

Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Non-Published Commonly Owned U.S. Appl. No. 17/967,795, filed Oct. 17, 2022, 39 pages, VMware, Inc.

Non-Published Commonly Owned U.S. Appl. No. 17/976,784, filed Oct. 29, 2022, 55 pages, VMware, Inc.

Non-Published Commonly Owned U.S. Appl. No. 18/083,536, filed Dec. 18, 2022, 27 pages, VMware, Inc.

Non-Published Commonly Owned U.S. Appl. No. 18/102,685, filed Jan. 28, 2023, 124 pages, VMware, Inc.

Non-Published Commonly Owned U.S. Appl. No. 18/102,687, filed Jan. 28, 2023, 172 pages, VMware, Inc.

Non-Published Commonly Owned U.S. Appl. No. 18/102,688, filed Jan. 28, 2023, 49 pages. VMware, Inc.

Non-Published Commonly Owned U.S. Appl. No. 18/102,689, filed Jan. 28, 2023, 46 pages, VMware, Inc.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Non-Published Commonly Owned U.S. Appl. No. 18/137,584, filed Apr. 21, 2023, 57 pages, VMware, Inc.

Non-Published Commonly Owned U.S. Appl. No. 18/197,090, filed May 14, 2023, 36 pages, Nicira, Inc.

Non-Published Commonly Owned U.S. Appl. No. 18/211,568, filed Jun. 19, 2023, 37 pages, VMware, Inc.

Non-Published Commonly Owned U.S. Appl. No. 18/222,864, filed Jul. 17, 2023, 350 pages, VMware, Inc.

Non-Published Commonly Owned U.S. Appl. No. 18/222,868, filed Jul. 17, 2023, 22 pages, VMware, Inc.

Non-Published Commonly Owned U.S. Appl. No. 18/224,466, filed Jul. 20, 2023, 56 pages, VMware, Inc.

Non-Published Commonly Owned U.S. Appl. No. 18/235,879, filed Aug. 20, 2023, 173 pages, VMware, Inc.

\* cited by examiner

METHODS FOR SMART BANDWIDTH AGGREGATION BASED DYNAMIC OVERLAY SELECTION AMONG PREFERRED EXITS IN SD-WAN

BACKGROUND

In the field of integrating a software defined wide area network (SD-WAN) with a legacy network to provide functionality to legacy applications, there are SD-WAN solutions that facilitate connections to such legacy networks, creating hybrid networks. In some cases, these hybrid networks encompass traditional multi-protocol label switching (MPLS) based underlay networks that need to integrate with the SD-WAN overlay networks.

SD-WAN overlay networks include managed forwarding elements (MFEs) (e.g., virtual switches and routers) that are controlled by network managers and/or controllers that configure the MFEs to implement the SD-WAN. When data packets leave the MFEs that implement the SD-WAN to go to unmanaged forwarding elements on the way to a legacy network on which a legacy application resides, this is referred to as "exiting" the SD-WAN. There are established exit points, from the SD-WAN overlay network, which typically find place in transit nodes such as Hubs, Partner Gateways, and Spoke edges. These exit points may be referred to as "local exit points" or "egresses" of the SD-WAN. These exit points peer with other underlay nodes (L3 switches, customer edge (CE) routers, and provider edge (PE) routers) which run external routing protocols such as BGP/OSPF, etc.

SD-WAN networks are often employed to connect customer branch nodes, sometimes called spoke edges, with provider datacenters. There are scenarios in which some legacy network(s) in the customer topology are connected in such a way that the network prefixes belonging to a legacy network are learned across multiple exit nodes of the SD-WAN overlay network. Thus the SD-WAN branch nodes (spoke edges) can end up learning the same legacy network prefix at multiple exit points of the SD-WAN. In some hybrid networks, an overlay flow control system available in a centralized orchestrator (e.g., VMware's Cloud Orchestrator (VCO)) collects all the external network prefixes dynamically learned by various nodes in the SD-WAN network.

In previous hybrid networks, the overlay flow control system provides the current method of choosing a preferred exit. The prior art method of defining routing preferences in these previous networks is based only on static routing parameters. The established route preferences in the existing art, which are static in nature, influence preferred exits from the SD-WAN network of data flows sent from the branch nodes to the legacy network(s). Among the eligible exits from the SD-WAN, (such as an on Premise Gateway (OPG), a Hub, a Spoke Edge and local router transit) the corresponding overlay tunnels may exhibit different number of physical links. Thus routes through different SD-WAN exits, than the statically selected route (and its corresponding exit), may potentially have different attributes that would be better at supplying specific application traffic performance across them.

Typically, common devices are grouped and setup with common profiles (routing policies & other settings), such as spoke profile, regional spoke profile, hub profile, etc. However, in the existing art, the preferences of routes (and thus exits) to use for the profiles are selected statically rather than adjusting to network conditions. This leads to sub-optimal application performance especially in cases of selecting routes through a preferred exit with a minimal number of WAN links for aggregation and associated application traffic throughput. Therefore, there is a need in the art for a method that receives routing policy priorities on a per application basis and selects routes (and SD-WAN exit points) to satisfy the selected priorities on a dynamic basis.

BRIEF SUMMARY

In some embodiments, a hybrid network that includes both machines in an SD-WAN and machines outside of the SD-WAN, such as servers at another location, implement one or more applications that are implemented partly by programs running on machines within the SD-WAN and partly by programs on machines running on a legacy network. Such a shared implementation may be used by a single application that is designed with elements on both types of machines, or applications implemented on the SD-WAN designed to interact with independent applications on the legacy server. The legacy network of some embodiments is outside of the SD-WAN and thus data going from the machines on the SD-WAN must pass through an exit point of the SD-WAN. Some embodiments of the present invention determine which of multiple SD-WAN exits to send a data flow of the application through based on a routing policy (e.g., a policy-based routing rule) for the application. For example, some applications may have a routing policy specifying a preference for highest throughput, highest redundancy, or some combination of throughput and redundancy.

The method of some embodiments selects a set of links to forward packets of a data flow from an application running on a machine connected to an SD-WAN that has multiple exits. The method, based on computed sets of attributes for a first set of links and a second set of links, selects between the first set of links and the second set of links. At least the first set of links has multiple links and at least one attribute of the first set of links is an attribute that is computed by aggregating an attribute of each of the links in the first set of links. The method uses the selected set of links to forward the packets of the data flow of the application to an egress managed forwarding element of the SD-WAN.

In some embodiments, the method computes an application assurance score (AAS) for each set of links of the multiple sets of links. Selecting between the first set of links and the second set of links includes identifying an AAS attribute specified in a policy-based routing rule for the application by an administrator of the SD-WAN and selecting the set of links that has an AAS that matches the AAS attribute specified in the policy-based routing rule.

The exits in some embodiments include at least two of a hub exit, an on-premise partner gateway, a spoke exit, and a local router exit. The network may include an overlay network and an underlay network. The computing, receiving, and selecting are performed by a branch node of the network in some embodiments.

In some embodiments, there may be multiple policies for multiple application types. In some such embodiments, the method also receives a packet of the data flow, identifies an application type of the data flow, and from the policies received for multiple applications types, selects a policy based on the identified application type. The application type is identified based on a destination port of the packet in some embodiments. The application type is identified based on at least two of a destination port of the packet, a source port of the packet, and a transport protocol of the packet in some embodiments. The method also receives multiple packets of the data flow, in some embodiments. Identifying the application type of the data flow, in some such embodiments, is based on at least one of metadata of the packets and headers of the packets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1A:
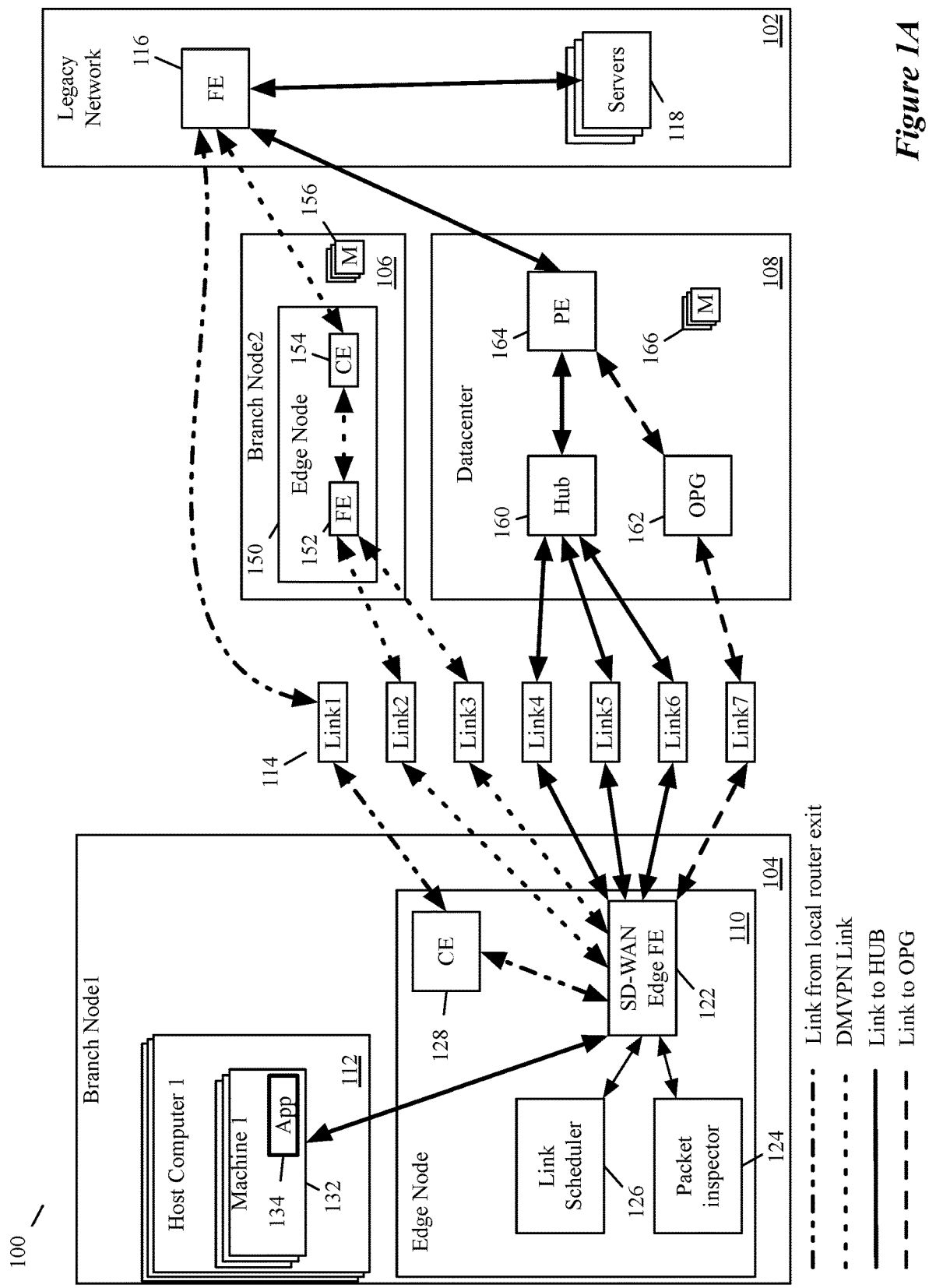
FIG. 1A illustrates an example of a hybrid network of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

SD-WAN overlay networks include managed forwarding elements (MFEs) (e.g., virtual routers) that are controlled by network managers and/or controllers that configure the MFEs to implement the SD-WAN. When data packets leave the MFEs that implement the SD-WAN to go to unmanaged forwarding elements on the way to a legacy network on which a legacy application resides, this is referred to as "exiting" the SD-WAN. There are established exit points, from the SD-WAN overlay network, which typically find place in transit nodes such as Hubs, Partner Gateways, and Spoke edges. These exit points may be referred to as "local exit points" or "egresses" of the SD-WAN. These exit points peer with other underlay nodes (L3 switches, customer edge (CE) routers, and provider edge (PE) routers) which run external routing protocols such as BGP/OSPF, etc.

In some embodiments, a hybrid network that includes both machines in an SD-WAN and machines outside of the SD-WAN, such as servers at another location, implement one or more applications that are implemented partly by programs running on machines within the SD-WAN and partly by programs on machines running on a legacy network. Such a shared implementation may be used by a single application that is designed with elements on both types of machines, or applications implemented on the SD-WAN designed to interact with independent applications on the legacy server. The legacy network of some embodiments is outside of the SD-WAN and thus data going from the machines on the SD-WAN must pass through an exit point of the SD-WAN. Some embodiments of the present invention determine which of multiple SD-WAN exits to send a data flow of the application through based on a routing policy (e.g., a policy-based routing rule) for the application. For example, some applications may have a routing policy specifying a preference for highest throughput, highest redundancy, or some combination of throughput and redundancy.

The method of some embodiments selects a set of links to forward packets of a data flow from an application running on a machine connected to an SD-WAN that has multiple exits. The method, based on computed sets of attributes for a first set of links and a second set of links, selects between the first set of links and the second set of links. At least the first set of links has multiple links and at least one attribute of the first set of links is an attribute that is computed by aggregating an attribute of each of the links in the first set of links. The method uses the selected set of links to forward the packets of the data flow of the application to an egress managed forwarding element of the SD-WAN.

The exits in some embodiments include at least two of a hub exit, an on-premise partner gateway, a spoke exit, and a local router exit. The network may include an overlay network and an underlay network. The computing, receiving, and selecting are performed by a branch node of the network in some embodiments.

In some embodiments, there may be multiple policies for multiple application types. In some such embodiments, the method also receives a packet of the data flow, identifies an application type of the data flow, and from the policies received for multiple applications types, selects a policy based on the identified application type. The application type is identified based on a destination port of the packet in some embodiments. The application type is identified based on at least two of a destination port of the packet, a source port of the packet, and a transport protocol of the packet in some embodiments. The method also receives multiple packets of the data flow, in some embodiments. Identifying the application type of the data flow, in some such embodiments, is based on at least one of metadata of the packets and headers of the packets.

Based on the scores that quantify the selected attribute of the sets of links, the method selects a set of links to use to route (or forward) an application's data flow through toward a particular exit. The computed scores in some embodiments are application assurance scores (AAS) with respect to a network attribute or metric, as further described below by reference to FIG. 2. In some embodiments, the network attributes for which AAS values can be specified include throughput, redundancy, and a metric derived from both throughput and redundancy. In some embodiments, throughput (or number of link) AAS scores may be measured in absolute terms (e.g., current aggregate throughput of the set of links) with higher current aggregate throughputs resulting in higher AAS scores for sets of links. In other embodiments, AAS scores for throughput may be measured in terms of what percentage of the time a set of links is expected to have a threshold throughput level. For example, in such embodiments, a set of links that maintained a threshold of 300 MHz 95% of the time would have a higher AAS score for applications with a policy-based routing rule that selects for that attribute than a set of links that sometimes had a momentarily higher throughput, but was only above 300 MHz 90% of the time.

An AAS of an attribute of a set of links can be referred to as "matching" the AAS attribute of a policy-based rule. When multiple sets of links have associated AAS values that match/satisfy the administrator-specified AAS for a routing policy, some embodiments select the set of links with the best AAS value (e.g., the highest throughput AAS value, or the lowest latency AAS value).

FIG. 1A illustrates an example of a hybrid network 100 of some embodiments. The hybrid network includes a legacy network 102, branch nodes 104 and 106, and a datacenter 108. Collectively, these elements may be referred to as network nodes. Network nodes 102-108 are generally at geographically separate locations (e.g., different parts of a city, different cities, different states, and/or different countries) though in some cases two or more network nodes could be located in the same place. The branch nodes 104 and 106 and the datacenter 108 are parts of an SD-WAN. Branch node 104 includes machines 132 (e.g., virtual machines, containers of a container network, etc.) implemented by one or more host computers 112. Branch node 106 includes machines 156, which may similarly be implemented by one or more host computers (not shown). The datacenter 108 has machines 166, which may also be implemented by host computers (not shown). Some or all of the other described elements of the branch nodes and/or of the datacenter may be implemented by such machines.

The legacy network 102 is outside the SD-WAN. Data sent from within the SD-WAN to the legacy network 102 must pass through an SD-WAN managed exit point (sometimes referred to simply as exit point, exit nodes, exit, egress node, egress forwarding node, and egress router). The exit nodes are some of the managed forwarding elements (such as managed routers) of the SD-WAN. The managed forwarding elements of the SD-WAN are forwarding elements that are configured by the SD-WAN controllers to implement the SD-WAN.

In FIG. 1A, the exit points include a hub 160 and an on premises gateway (OPG) 162 in the datacenter 108, and forwarding elements (FEs) 122 and 152 on branch nodes 104 and 106, respectively. These forwarding elements (e.g., 160, 162, 122, 152) are routers in some embodiments. One of ordinary skill in the art will understand that the FEs 122 and 152 optionally act as local managed SD-WAN router exits and can optionally send data packets either to other parts of the SD-WAN, or send data packets out of the SD-WAN through customer edges (CEs) 128 and 154 on branch nodes 104 and 106, respectively.

The branch node 104 includes an edge node 110, for sending and receiving data outside the branch node 104, and a host computer 112. The host computer 112 hosts one or more machines 132. These machines 132 could be virtual machines, containers of a container network, etc. A machine 132 hosts an application 134 that sends a data flow (e.g., a series of data packets) to and/or receives data from servers 118 operating on legacy network 102. Within the branch node 104, the data flow is sent to an SD-WAN edge forwarding element (FE) 122. The FE 122 determines what set of links to use to send the data packets on by interfacing with packet inspector 124 and link scheduler 126.

The link scheduler 126, of some embodiments, maintains a list of routing policy preferences for different applications and monitors various attributes of links used to send data within the SD-WAN along possible routes between the branch node 104 and the legacy network 102. In some embodiments, the link scheduler 126 computes a set of application assurance scores (sometimes referred to herein as "AAS" or "AAS scores") for sets of links through various exit points of the SD-WAN. For example, the link scheduler 126 may compute a set of AAS scores for sets of links usable to reach each particular exit point. Each set of scores include scores quantifying throughput, redundancy, and some metric that combines redundancy and throughput. Since there are four exit points from the SD-WAN, computing the scores for three attributes would mean computing a total of twelve scores in this example.

The packet inspector 124 determines which application (or application type) data packets of a particular data flow belong to. In some embodiments, the packet inspector 124 determines this by examining copies of packets of a data flow sent to the packet inspector 124 from the FE 122. The packet inspector 124 may identify the application and/or the application type that sent a particular data flow based on one or more elements of an address tuple of the packet (e.g., source IP address, source port, destination IP address, destination port, transport protocol (e.g., TCP/UDP)).

In some embodiments, the packet inspector 124 identifies the application based on the destination port of a data packet of the flow. In other embodiments, the packet inspector 124 identifies the application based on other elements or combination of elements of an address tuple of the packets (e.g., based on source port and destination port, based on both ports plus transport protocol, etc.). In other embodiments, the packet inspector 124 identifies the applications based on other headers or metadata of one or more packets of the flow, based on some other property of the packets (e.g., by inspecting an application layer (L7) layer of the packet for data such as an application ID), or by some combination of the above identified properties. Based on the application type and the routing policy preference for that application type, a particular attribute of AAS scores is selected (e.g., one of throughput, redundancy, or a combination of throughput and redundancy). The link scheduler 126 then uses the current AAS scores for the available sets of links from the branch node 104 to the legacy network 102 to select the best set of links to use (i.e., best according to the route policy preference for that application).

In the embodiment just described, the link scheduler receives data about the application type (e.g., from the FE 122) and selects the set of links. However, one of ordinary skill in the art will understand that in other embodiments, other elements may analyze the data and select a set of links. For example, the link scheduler 126 may generate and update a list of preferred sets of links for each application (or application type) and supply this list to the FE 122, while the packet inspector 124 identifies the application (or application type) of a set of data packets in a data flow and supplies this identification to the FE 122. In such embodiments, the FE 122 determines the routing path for a particular data flow based on the identified application (or application type) and the previously received list of preferred sets of links.

Some of the routes between the branch node 104 and the legacy network 102 pass through a datacenter 108 that includes exit points of the SD-WAN, including a hub 160 and an OPG 162. One or more machines 166 of datacenter 108 may implement part of the SD-WAN (e.g., as service machines or guest machines). The datacenter 108 also includes a provider edge (PE) 164 that sends data packets to and receives data packets from network locations administered by other providers or by customers.

In FIG. 1A, there are multiple routes using four possible sets of links 114 that the link scheduler 126 tracks between the branch node 104 and the legacy network 102. The first route passes (i.e., data packets on that route are sent) from the FE 122 through one of the links 114 (link 7, the only link in the first set of links), then the OPG 162 in the datacenter 108. The OPG 162 then sends the packet out of the SD-WAN (e.g., removes any SD-WAN encrypting or encoding from the packet), and sends the packet out of the datacenter 108 through a PE 164. From the PE 164, the route then goes through an FE 116 of the legacy network 102 to the servers 118. Packets sent along the opposite route (reply packets), in some embodiments, enter the SD-WAN network at the OPG 162.

The second through fourth routes pass from the FE 122 through a second set of three of the links 114, (links 4, 5, and 6), then a hub 160 in the datacenter 108. In some embodiments, different data packets in the same data flow, sent along these routes to the hub 160, may be sent through different links 114 in order to increase the total throughput between the FE 122 and the hub 160 beyond what any one of the links 4, 5, or 6 would provide individually. Having three of the physical links 114 in the set may also increase the redundancy score of the set of links as one or two of the three links 114 in the set could become congested or otherwise perform poorly without rendering the set of links as a whole ineffective. The hub 160 then sends the packet out of the SD-WAN (e.g., removes any SD-WAN encrypting or encoding from the packet), and sends the packet out of the datacenter 108 through the PE 164. From the PE 164, the route then goes through an FE 116 of the legacy network 102 to the servers 118. The FE 116 is not managed by any controllers or managers of the SD-WAN. Packets sent along the opposite routes (reply packets), in some embodiments, enter the SD-WAN network at the hub 160.

The fifth and sixth routes are part of a dynamic multipoint virtual private network (DMVPN) that dynamically forms SD-WAN tunnels that allow spoke edges of a network to communicate directly. That is, the DMVPN allows data packets in the SD-WAN to be sent from one spoke edge to another spoke edge without passing through a hub (e.g., a datacenter) that connects to each spoke edge. The fifth and sixth routes pass from the FE 122 through the third set of links, specifically a set of two of the links 114, (links 2 and 3), then an FE 152 in the branch node 106. In some embodiments, different data packets in the same data flow, sent along routes to the FE 152, may be sent through different links 114 in order to increase the total throughput between the FE 122 and the hub 160 beyond what one of the links 2 and 3 in the set would provide individually. Having two physical links 114 in the set may also increase the redundancy score of the set of links because one of the two links 114 could fail without rendering the set of links as a whole ineffective. The FE 152 then sends the packet out of the SD-WAN (e.g., removes any SD-WAN encrypting or encoding from the packet), and sends the packet out through a customer edge (CE) 154 of the branch node 106. From the CE 154, the route then goes through an FE 116 of the legacy network 102 to the servers 118. As mentioned previously, the FE 116 is not managed by controllers or managers of the SD-WAN. Packets sent along the opposite routes (reply packets), in some embodiments, enter the SD-WAN network at the FE 152.

The seventh route uses the FE 122, of branch node 104 itself, as an exit point from the SD-WAN. The FE 122 then sends the packets out through a CE 128 of the branch node 104. From the CE 128, the route then goes through one of the links 114, (link 1, the only link in the fourth set of links), to the FE 116 of the legacy network 102 and on to the servers 118. Packets sent along the opposite route (reply packets), in some embodiments, enter the SD-WAN network at the FE 122.

In some embodiments, the hybrid network supports multi-cloud connectivity. This multi-cloud connectivity may include Non SDWAN Destinations (NSDs) that are cloud destinations to which the SD-WAN network has explicit static IP security (IPsec) tunnels which are implemented with a border gateway protocol (BGP). The hybrid network may also exchange routes for legacy cloud hosted networks. That is, when an exit point of the SD-WAN sends out the data packets of a data flow, it may send them out with encryption and/or encoding that puts the data packets into an IPsec tunnel (e.g., an IPsec tunnel to the FE 116 or other element of the legacy network 102) at which point the FE 116 or some other element of the legacy network 102 decrypts or decodes the packet to remove it from the IPsec tunnel. In some embodiments, one NSD encoder is set up for a hybrid network. However, in other embodiments, multiple such NSD encoders may be set up to reach one or more legacy networks based on a client's network design to detour legacy traffic via a cloud network (e.g., AWS, Azure, GCP, etc.). In some embodiments, a single NSD encoder may set up multiple IPsec tunnels for multiple NSDs. One of ordinary skill in the art will understand that an IPsec tunnel is not a physically isolated route, but a set of security protocols that protect the contents of packets from being read by third-parties that might intercept the packets.

Figure 1B:
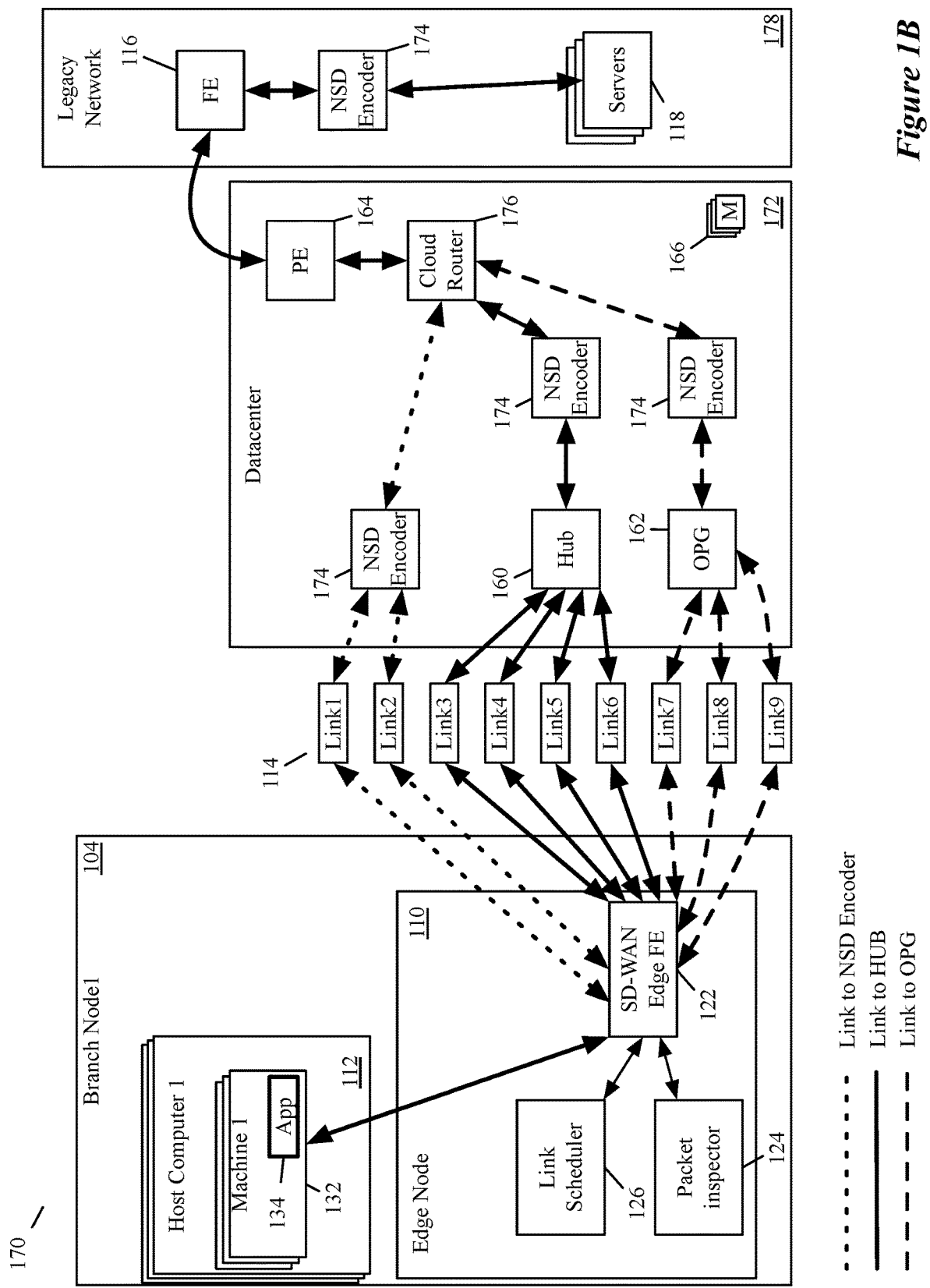
FIG. 1B illustrates an example of a hybrid network with NSD encoders, of some embodiments.

Different hybrid networks in which the methods of some embodiments are implemented may encode data packets for IPsec tunnels for NSDs using different elements of a datacenter FIG. 1B illustrates an example of a hybrid network 170 with NSD encoders 174, of some embodiments. FIG. 1B includes NSD encoders 174, cloud router 176, and legacy network 178. The NSD encoders 174 are set up to encode and decode data packets sent between a datacenter and a legacy network. The NSD encoders are software or elements of software specifically designed for encoding packets for IPsec tunnels of NSDs. In some embodiments, the NSD encoders 174 can also act as exit points from the SD-WAN. In FIG. 1B, the NSD encoder 174 along the routes that pass through link 1 and link 2 of links 114 acts as an endpoint of the SD-WAN network. However, an NSD encoder 174 can also be set up and configured to act on packets that have already left the SD-WAN through one of the previously described exit points. For example, NSD encoders 174 receive data packets from two exit points of the SD-WAN, the hub 160 and the OPG 162. After the data packets are encoded/encrypted by the NDS encoders 174, the data packets are sent to a cloud router 176, then out through PE 164 to FE 116 of the legacy network 178. FE 116 forwards the data packets to an NSI) encoder 174 on the legacy network which decodes/decrypts the packets and forwards them on to the servers 118.

Although the hybrid network 170 of FIG. 1B includes NSD encoders 174 only in the datacenter 172 and legacy network 178, other embodiments may include NSD encoders at other network locations, such as branch node 104 or 106 of FIG. 1A. For example, an IPsec for an NSD to the legacy network's FE 116 could be set up by an NSD encoder of a branch node (e.g., before, after, or within FEs 122 or 152). The hybrid networks of still other embodiments may set up an IPsec for an NSD on some other element, such as a CE, PE, etc. In hybrid networks of still other embodiments, IPsecs for NSDs may be set up between the SD-WAN and destinations other than the legacy network.

Figure 2:
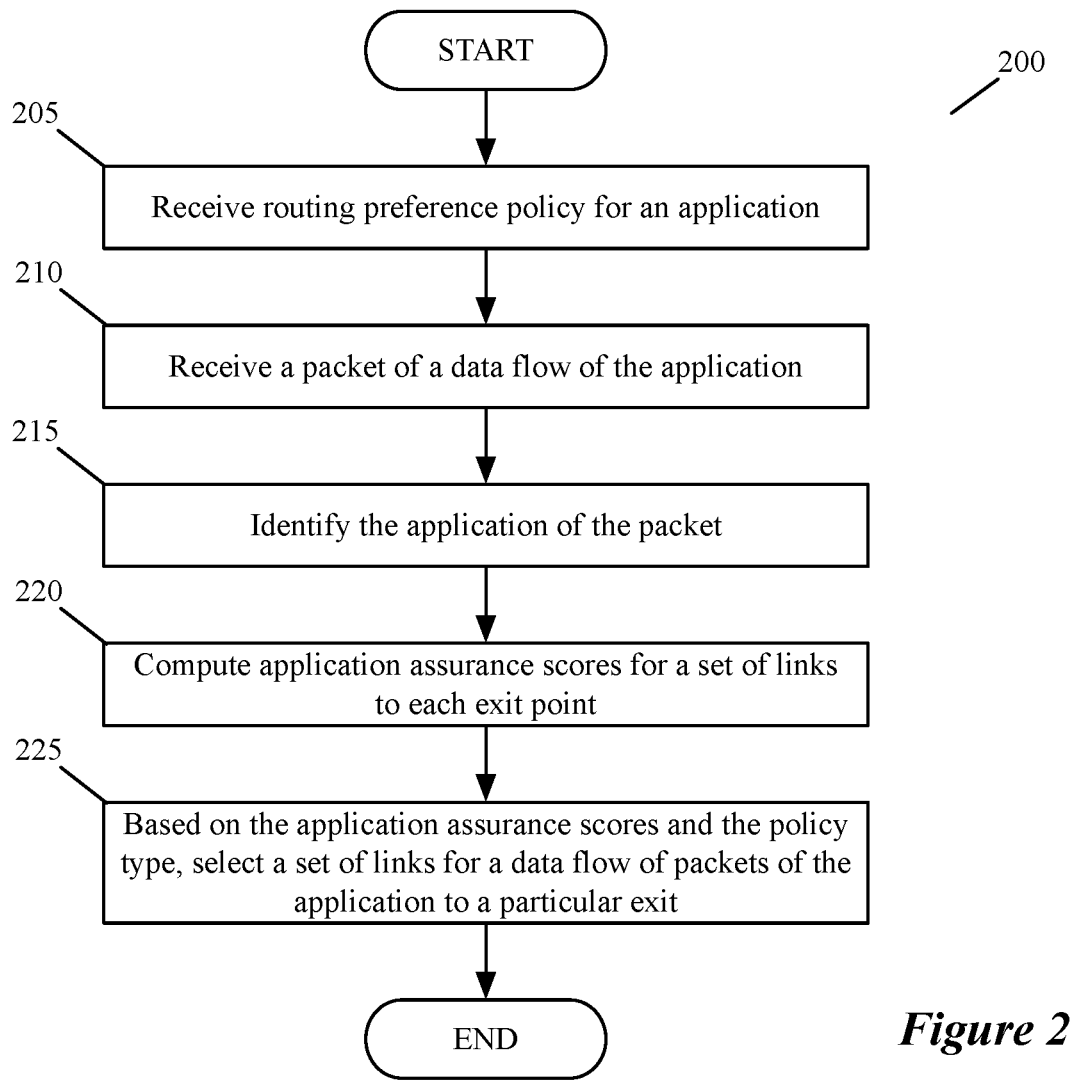
FIG. 2 conceptually illustrates a process of some embodiments for selecting sets of links for packets of specific application based on application assurance scores (AAS).

As previously mentioned, AAS scores for each of these sets of links may be generated by link scheduler 126. Then the link scheduler 126 in some embodiments (or the FE 122 in other embodiments) uses these AAS scores to select a set of links to use for packets of particular applications. FIG. 2 conceptually illustrates a process 200 of some embodiments for selecting sets of links to use for packets of specific application based on AAS scores. The process 200 receives (at 205) a routing preference policy for an application. The application policy, in some embodiments, is a high level policy such as "best throughput," "best redundancy," or "best combination of throughput and redundancy." A user interface for selecting routing preference policies for application is further described with respect to FIG. 3, below. A control sequence for receiving and utilizing routing policy preferences is further described with respect to FIG. 4, below. Although this process 200 focuses on one application and the routing preference policy for that application, one of ordinary skill in the art will understand that in general, in some embodiments, routing preference policies for multiple applications may be received at the same time or in close proximity to each other.

The process 200 receives (at 210) a packet of a data flow of the application. The process 200 identifies (at 215) the application which sent the packet (or in some embodiments the type of application that sent the packet). The process 200 computes (at 220) AAS scores for a set of links for each exit point. Some examples of generating AAS scores for various attributes follow.

As a first example, for an application whose routing preference policy calls for maximum aggregate throughput. Suppose (1) an OPG exit point has one physical link with a current throughput of 100 Mbps from the branch node towards it, (2) a hub exit point has three physical links each with a current throughput of 100 Mbps from the branch node towards it (totaling 300 Mbps), and (3) an exit point at a second branch node has two physical links, one with a current throughput of 1 Gbps and another with a current throughput of 100 Mbps from the branch node towards it (totaling 1.1 Gbps). In operation 220, the branch node generates the AAS scores across each of these links. It then derives link set preference values based on the AAS score of preferred exit node, based on the application's routing preference policy (maximum aggregate throughput) and would then end up picking a set of links through the spoke exit point as highly preferred due to the AAS score of 1.1 Gbps, which is the highest available throughput. In some embodiments, the AAS scores are updated according to current network conditions. In some such embodiments, a new exit point and set of links may be chosen when conditions change. For example, if the 1 Gbps link to the second branch node dropped down to an effective 100 Mbps, the AAS score of the set of links through the hub would be higher than the AAS score through the second branch node and later data packets could be shifted to the set of links used to send packets through the hub.

As a second example, an application's associated routing preference policy may call for maximum redundancy. Suppose (1) the PG exit point has one physical link from the branch node towards it, (2) the hub exit point has three physical links from the branch node towards it, and (3) the second branch node exit point has two physical links from the branch node towards it. In this example the operation 220 would generate AAS scores indicating that the hub exit point has the maximum redundancy. In some embodiments, the redundancy may be determined based on other factors than the number of physical links. In some such embodiments, the performance of the physical links may be taken into account. For example, a set of links with three physical links to the exit point, two of which are inoperative or below a threshold operational speed would have a lower AAS redundancy score than a set of links with two operational links.

In some embodiments, the AAS scores for redundancy, throughput, or a metric that combines redundancy or throughput may be modified based on other factors. For example, the jitter, loss, or latency of the links (or other parts of routes that include the links) may affect the AAS scores. Similarly, other factors that affect or reflect the error resiliency and/or speed of the links and/or routes may affect the AAS scores. In some embodiments, other metrics of the health of the links and/or other parts of the routes may affect the AAS scores. In some embodiments, factors used to generate the AAS scores may be identified (or measured) as part of a dynamic multi-path optimization (DMPO) process.

Various embodiments perform this operation 220 in ways that generate different sets of scores. In some embodiments, a link scheduler computes AAS scores for each of several attributes of sets of links leading to available exit points. For example, in such embodiments, even if only one application was communicating with a legacy network, and that application's associated routing preference policy called for "best throughput," the link scheduler would still generate AAS scores for "best redundancy" and "best combination of redundancy and throughput" as well as "best throughput." In some such embodiments, AAS scores for the set of links leading to each exit point and each attribute are updated as network conditions change (e.g., as links become congested, etc.). In contrast, in other embodiments, the link scheduler computes AAS scores only for attribute called for in routing preference policies applications that are actively sending data to a legacy network. For example, in such embodiments, if all applications contacting the legacy server used the "best throughput" policy, then the link scheduler would only generate throughput scores for each exit, rather than generating the unused score types. In still other embodiments, AAS scores for particular attributes may be generated as long as at least one received routing preference policy calls for that attribute to be preferred, whether the associated application is currently active or not.

Various embodiments may generate the AAS scores based on different factors. Some embodiments base the AAS scores for a set of links primarily or solely on the attributes of the physical links between the branch node and an exit point of the SD-WAN network (e.g., the current throughput of the link, attributes relating to the redundancy of the link, etc.). Other embodiments base the AAS scores on attributes of the entire set of potential routes using those links from the branch node (that implements the application) to the legacy network. Still other embodiments may base the AAS scores on additional factors that affect the overall performance of the routes using those sets of links.

After computing the AAS scores, the process 200 selects (at 225) a set of links for a data flow of packets of the identified application. The set of links is selected based on the AAS scores that rate the attribute selected in the routing preference policy for the application (or application type in some embodiments). For example, if an application was assigned the "maximum throughput" routing policy, the set of links with the highest AAS throughput score would be selected for data packets of the application.

Figure 3:
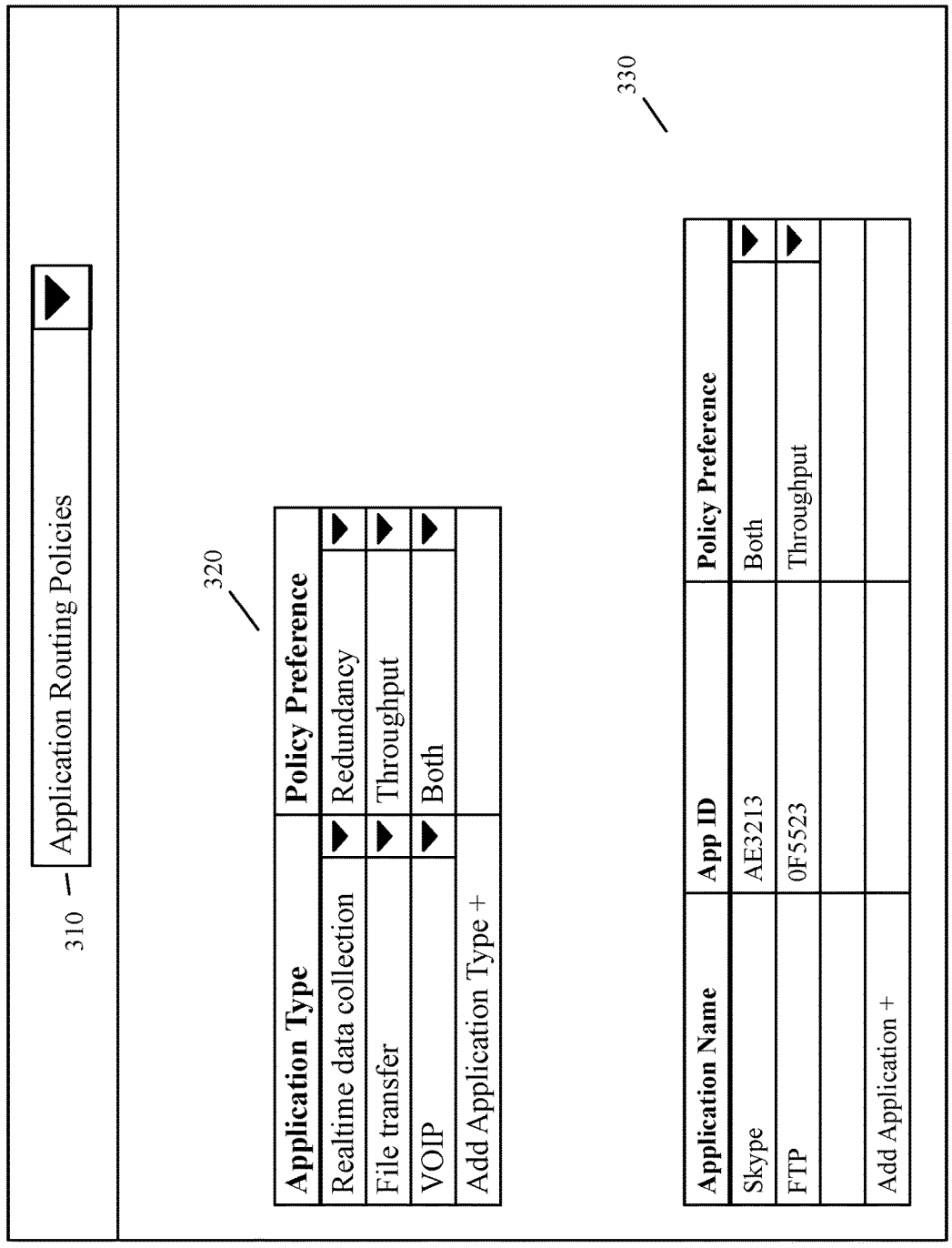
FIG. 3 illustrates a graphical user interface (GUI) of a network manager interface of some embodiments.

FIG. 3 illustrates a graphical user interface (GUI) of a network manager interface of some embodiments. The GUI 300 includes a pull-down menu 310 for selecting what network features to manage, an interface item 320 for selecting routing policy preferences based on application type, and an interface item 330 for selecting routing policy preferences for specific applications. The GUI 300 is a graphical display of a screen of a network manager interface that provides separate screens for controlling different aspects of a client network. The pull-down menu 310 shows the currently selected set of controls, here, the application routing policies. The interface item 320 is formatted as a table that includes pull-down selectors for application types and pull-down selectors to select a policy preference for each application type. Similarly, the interface item 330 is formatted as a table that includes area for a user to input a specific application name, an application ID, and pull-down selectors to select a policy preference for each application type.

The illustrated GUI 300 is one example of such a GUI and one of ordinary skill in the art will understand that other GUIs are possible within the scope of the invention. For example, GUIs of some embodiments may have one interface item that handles both policy preferences for specific applications and for application types. In other embodiments, the GUI allows selections of only application types, not specific applications. In still other embodiments, the GUI allows selections of routing policy preferences for each specific application, but does not allow a selection of a general routing policy preference for all applications of a particular type.

Figure 4:
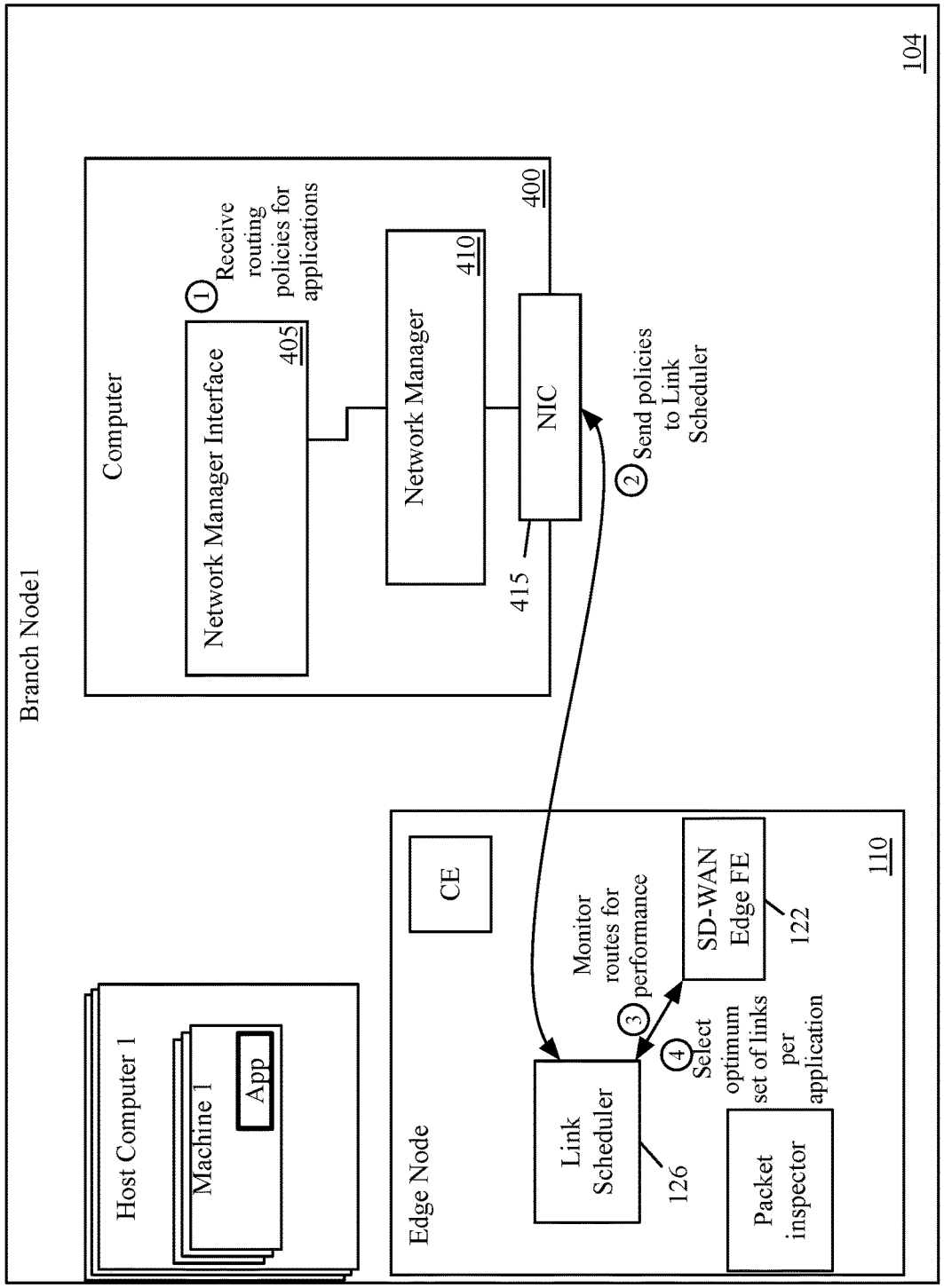
FIG. 4 illustrates a control sequence for receiving and utilizing routing policy preferences in some embodiments.

FIG. 4 illustrates a control sequence for receiving and utilizing routing policy preferences in some embodiments. FIG. 4 includes previously identified elements branch node 104, edge node 110, SD-WAN edge FE 122, and link scheduler 126 from FIG. 1A. FIG. 4 additionally includes computer 400 with network manager interface 405, network manager 410, and network interface card (NIC) 415. The network manager interface 405 is software (or an element of a piece of software) that provides a GUI for managing the network such as GUI 300 of FIG. 3. The network manager 410 is software (or an element of a piece of software) that implements the commands provided by an administrator using the GUI for the network manager interface 405. The NIC 415 is an interface card for communicating with other computers and devices over a network. Although these elements 405-415 are shown on a separate computer 400, one of ordinary skill in the art will understand that any or all of these elements may be implemented by a machine (e.g., a virtual machine) operating on a physical computer.

The control sequence is in four parts. First, the network manager interface 405 receives routing policies for applications on the branch node 104. Second, these policies are sent through a network manager 410 and the NIC 415 to the link scheduler 126. Third, the link scheduler 126 monitors the routes (or in some embodiments, portions of the routes) that use each set of links for various performance metrics corresponding to the different routing policies. The task scheduler uses these metrics to compute AAS scores for the available sets of links to a legacy server (not shown). Fourth, the link scheduler 126 (or in some embodiments the FE 122) selects an optimum set of links for each application (e.g., each application sending data flows to the legacy server).

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs. Although the above descriptions describe data in certain formats, such as "lists," one of ordinary skill in the art will understand that the invention is not limited to any particular data format and that any instance of "list" should be considered to also disclose any other form of multi-element, associated data organization, such as database entries, linked lists, arrays of pointers to data in memory locations, hashed data, spreadsheets, etc.

Figure 5:
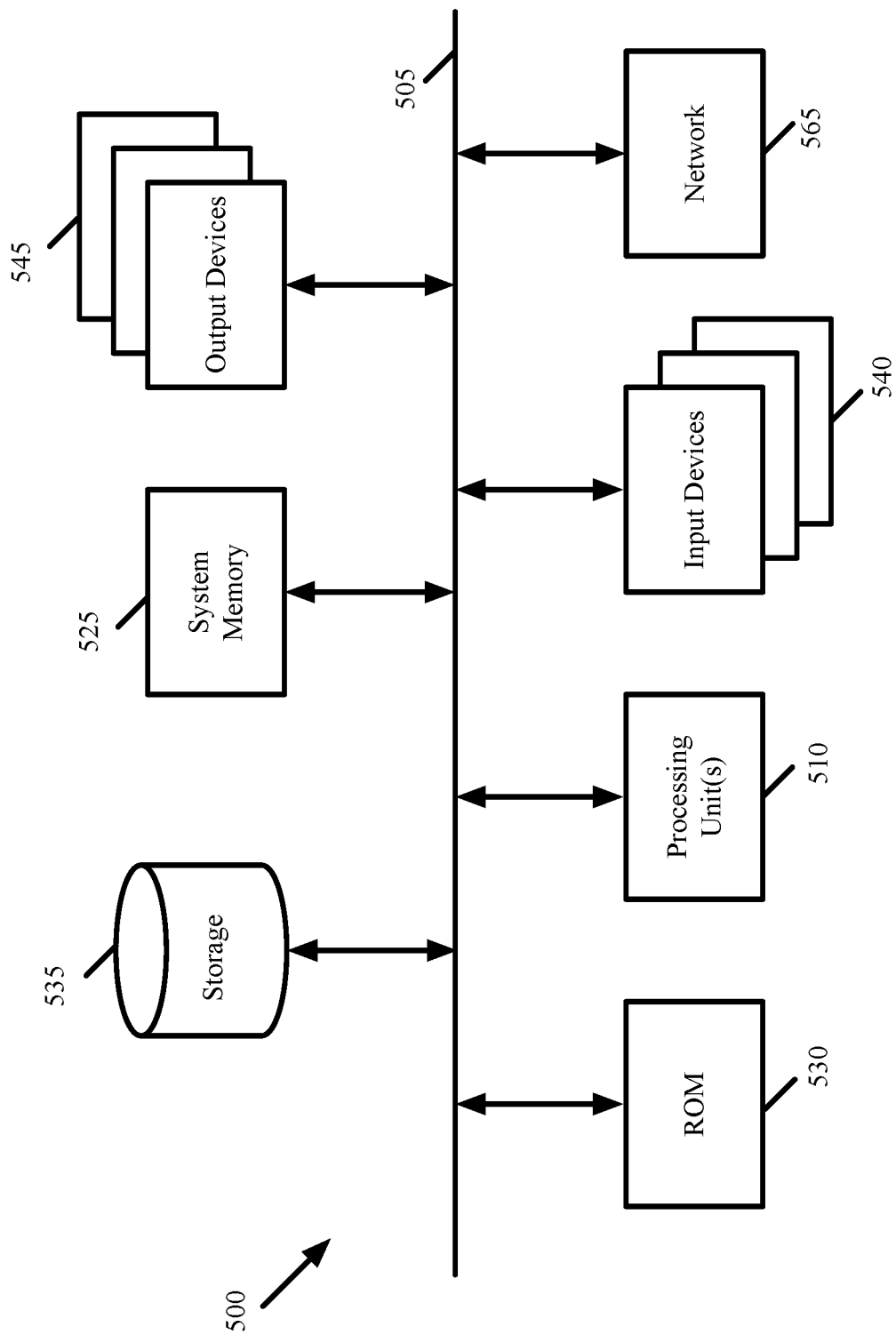
FIG. 5 conceptually illustrates a computer system with which some embodiments of the invention are implemented.

FIG. 5 conceptually illustrates a computer system 500 with which some embodiments of the invention are implemented. The computer system 500 can be used to implement any of the above-described hosts, controllers, gateway and edge forwarding elements. As such, it can be used to execute any of the above-described processes. This computer system 500 includes various types of non-transitory machine-readable media and interfaces for various other types of machine-readable media. Computer system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the computer system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments. The read-only-memory (ROM) 530 stores static data and instructions that are needed by the processing unit(s) 510 and other modules of the computer system. The permanent storage device 535, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device 535. Like the permanent storage device 535, the system memory 525 is a read-and-write memory device.

However, unlike storage device 535, the system memory 525 is a volatile read-and-write memory, such as random access memory. The system memory 525 stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices 540 enable the user to communicate information and select commands to the computer system 500. The input devices 540 include alphanumeric keyboards and pointing devices (also called "cursor control devices"). The output devices 545 display images generated by the computer system 500. The output devices 545 include printers and display devices, such as cathode ray tubes (CRT) or liquid crystal displays (LCD). Some embodiments include devices such as touchscreens that function as both input and output devices 540 and 545.

Finally, as shown in FIG. 5, bus 505 also couples computer system 500 to a network 565 through a network adapter (not shown). In this manner, the computer 500 can be a part of a network of computers (such as a local area network ("LAN"), a wide area network ("WAN"), or an Intranet), or a network of networks (such as the Internet). Any or all components of computer system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of selecting a set of links to forward packets of a particular data flow from an application running on a machine operating in a site that is connected to a software-defined wide area network (SD-WAN) through a plurality of different sets of physical links, the method comprising:
   receiving a routing policy for forwarding data flows of the application through the SD-WAN;
   based on sets of attributes for a first set of links and a second set of links of the plurality of sets of links, computing, for each set of links, a set of scores that quantify a set of one or more criteria used to define the routing policy, wherein the first set of links has a plurality of links and the set of attributes for the first set of links comprises an aggregate attribute that is computed by aggregating dynamically changing link attributes of the plurality of links in the first set of links, wherein said dynamically changing link attributes change as network conditions change;
   based on the computed sets of scores, selecting the first set of links as the set of links that satisfies the received routing policy; and
   using the selected first set of links to forward the packets of the particular data flow of the application to an egress managed forwarding element of the SD-WAN.

2. The method of claim 1, wherein the routing policy is a high level policy expressed in terms of the set of one or more criteria that are not specific to any sets of links, and the computed set of scores for each set of links comprises an application assurance score (AAS) for the set of links of the plurality of sets of links with respect to the set of criteria expressed in the high level policy, wherein selecting the first set of links based on the computed sets of scores comprises selecting the first set of links after determining the first set of links has a computed AAS for the specified set of criteria that is better than the AAS that is computed for the second set of links.

3. The method of claim 2, wherein the routing policy is a first routing policy of a plurality of routing policies for a plurality of application types, wherein the first routing policy is selected from the plurality of routing policies based on an application type of the particular data flow.

4. The method of claim 3, wherein the application type is identified based on a destination port of a packet of the particular data flow.

5. The method of claim 3, wherein the application type is identified based on at least two of a destination port of a packet of the particular data flow, a source port of the packet, and a transport protocol of the packet.

6. The method of claim 3 further comprising receiving a plurality of packets of the particular data flow, wherein the application type of the particular data flow is identified based on inspection of layer 7 values stored in packets of the particular data flow.

7. The method of claim 2, wherein the set of criteria specified by the routing policy comprises at least one of a highest aggregate throughput for a set of links, an AAS for maximum number of links for the set of links, and an AAS for a maximum percentage of time for which a minimum acceptable throughput is available from the set of links.

8. The method of claim 2, wherein the set of criteria specified by the routing policy comprises at least one of throughput, redundancy, and a combination of both throughput and redundancy.

9. The method of claim 1, wherein different set of links are associated with different managed forwarding elements of the SD-WAN that are managed by a set of controllers of the SD-WAN.

10. The method of claim 9, wherein packet flows that are sent to a managed forwarding element through the set of links associated with the managed forwarding element are then forwarded by the managed forwarding element to a forwarding element that is not managed by the set of controllers of the SD-WAN.

11. The method of claim 10, wherein the forwarding elements include routers.

12. The method of claim 1, wherein the second set of links has a plurality of links and at least one attribute of the second set of links is an attribute that is computed by aggregating an attribute of each of the links in the second set of links.

13. The method of claim 1, wherein the site is a SD-WAN first site, the plurality of links comprise at least two physical links connecting the SD WAN first site to a hub of the SD-WAN, a physical link connecting the SD-WAN first site to a second site's on-premise gateway that is a legacy non SD-WAN gateway, and a physical link connecting the SD-WAN first site to a forwarding element at an SD-WAN third site.

14. The method of claim 1, wherein the SD-WAN is an overlay network.

15. A non-transitory machine readable medium storing a program that when executed by at least one processing unit selects a set of links to forward packets of a data flow from an application running on a machine operating in a site that is connected to a software-defined wide area network (SD-WAN) through a plurality of different sets of physical links, the program comprising sets of instructions for: based on sets of attributes for a first set of links and a second set of links of the plurality of sets of links, computing, for each set of links, a set of scores that quantify a set of one or more criteria used to define the routing policy, wherein the first set of links has a plurality of links and the set of attributes for the first set of links comprises an aggregate attribute that is computed by aggregating dynamically changing link attributes of the plurality of links in the first set of links, wherein said dynamically changing link attributes change as network conditions change; based on the computed sets of scores, select the first set of links as the set of links that satisfies the received routing policy; and using the selected first set of links to forward the packets of the particular data flow of the application to an egress managed forwarding element of the SD-WAN.

16. The non-transitory machine readable medium of claim 15, wherein the program further comprises sets of instructions wherein the routing policy is a high level policy expressed in terms of the set of one or more criteria that are not specific to any sets of links, and the computed set of scores for each set of links comprises an application assurance score (AAS) for the set of links of the plurality of sets of links with respect to the set of criteria expressed in the high level policy, wherein selecting the first set of links based on the computed sets of scores comprises selecting the first set of links after determining the first set of links has a computed AAS for the specified set of criteria that is better than the AAS that is computed for the second set of links.

17. The non-transitory machine readable medium of claim 16, wherein the routing policy is a first routing policy of a plurality of routing policies for a plurality of application types, wherein the first routing policy is selected from the plurality of routing policies based on an application type of the particular data flow.

18. The non-transitory machine readable medium of claim 17, wherein the application type is identified based on a destination port of a packet of the particular data flow.

19. The non-transitory machine readable medium of claim 17, wherein the application type is identified based on at least two of a destination port of a packet of the particular data flow, a source port of the packet, and a transport protocol of the packet.

20. The non-transitory machine readable medium of claim 17, wherein the program further comprises sets of instructions for receiving a plurality of packets of the particular data flow, wherein the application type of the particular data flow is identified based on inspection of layer 7 values stored in packets of the particular data flow at least one of metadata of the packets and headers of the packets.

* * * * *